(12) United States Patent
Takahashi

(10) Patent No.: US 7,616,361 B2
(45) Date of Patent: Nov. 10, 2009

(54) COLOR PROCESSING APPARATUS AND ITS METHOD

(75) Inventor: Kosei Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 511 days.

(21) Appl. No.: 11/276,627

(22) Filed: Mar. 8, 2006

(65) Prior Publication Data

US 2006/0204083 A1   Sep. 14, 2006

(30) Foreign Application Priority Data

Mar. 14, 2005 (JP) ............................. 2005-071735

(51) Int. Cl.
*G03F 3/08* (2006.01)
(52) U.S. Cl. .................. 358/520; 358/1.9; 358/300; 358/518; 358/519; 345/589; 345/599; 345/600; 382/162; 382/167
(58) Field of Classification Search ............... 358/1.9, 358/300, 518; 345/589; 382/162, 167
See application file for complete search history.

(56) References Cited

U.S. PATENT DOCUMENTS

| | | | | |
|---|---|---|---|---|
| 5,231,504 A | * | 7/1993 | Magee | 358/500 |
| 5,319,473 A | * | 6/1994 | Harrington | 358/501 |
| 5,363,218 A | * | 11/1994 | Hoshino | 358/518 |
| 5,982,925 A | * | 11/1999 | Koizumi et al. | 382/166 |
| 6,711,289 B1 | * | 3/2004 | Sakamoto | 382/167 |
| 6,724,507 B1 | * | 4/2004 | Ikegami et al. | 358/518 |
| 6,917,444 B1 | * | 7/2005 | Moriwaki | 358/1.9 |
| 6,987,567 B2 | | 1/2006 | Takahashi et al. | 356/405 |
| 7,064,864 B2 | * | 6/2006 | Takahashi et al. | 358/1.9 |
| 7,239,422 B2 | * | 7/2007 | Braun et al. | 358/1.9 |
| 2005/0052669 A1 | | 3/2005 | Takahashi | 358/1.9 |
| 2005/0083346 A1 | | 4/2005 | Takahashi et al. | 345/600 |
| 2006/0066887 A1 | | 3/2006 | Saida et al. | 358/1.13 |
| 2006/0119870 A1 | * | 6/2006 | Ho et al. | 358/1.9 |

FOREIGN PATENT DOCUMENTS

| | | |
|---|---|---|
| JP | 2003-283846 | 10/2002 |
| JP | 2003-283846 A | 10/2003 |

\* cited by examiner

*Primary Examiner*—Twyler L Haskins
*Assistant Examiner*—Miya J Cato
(74) *Attorney, Agent, or Firm*—Fitzpatrick, Cella, Harper & Scinto

(57) ABSTRACT

In gamut mapping, when saturation is linearly compressed, a saturation drop of a low-saturation part is considerable. Linear compression based on zone division produces discontinuous points. Nonlinear compression cannot automatically and uniquely calculate a conversion curve. To combat these problems, first and second gamut data are obtained, the lightness ranges of the gamut data are normalized, and the lightness, hue, and saturation values of a sample point of the first gamut data after normalization are calculated. Maximum saturation points which have lightness and hue values equal to those of the sample points are calculated from the first and second gamut data after normalization. A color conversion table is then generated by calculating a mapping point in the second color gamut after normalization, which corresponds to the sample point, on the basis of the saturation values of the maximum saturation points and sample point.

6 Claims, 23 Drawing Sheets

FIG. 4

| R | G | B | L* | a* | b* |
|---|---|---|------|------|------|
| 0 | 0 | 0 | 0.00 | 0.00 | 0.00 |
| 0 | 0 | 32 | ..... | ..... | ..... |
| 0 | 32 | 96 | ..... | ..... | ..... |
| 255 | 255 | 255 | 100 | 0 | 0 |

FIG. 16

| R | G | B | L* | a* | b* |
|---|---|---|---|---|---|
| 0 | 0 | 0 | 0 | 0 | 0 |
| 0 | 0 | 32 | 0.94 | 6.62 | -17.34 |
| ... | ... | ... | ... | ... | ... |
| 255 | 255 | 255 | 100 | 0 | 0 |

COLOR PROCESSING APPARATUS AND ITS METHOD

FIELD OF THE INVENTION

The present invention relates to a color processing apparatus and its method and, more particularly, to color processing for color-converting image data between different color gamuts.

BACKGROUND OF THE INVENTION

When color matching must be done between devices having different color gamuts (e.g., upon outputting a color image displayed on a monitor using a printer), processing for compressing the color gamut is executed. Since the monitor and printer have different color gamuts, colors which can be represented by the monitor but cannot be represented by the printer are mapped to those which can be represented by the printer.

It is a common practice to compress the color gamut on a device-independent color space such as a CIELab space (to be referred to as an Lab space hereinafter). Especially, saturation compression uses a method such as linear compression (a of FIG. 1), linear compression based on zone division (b of FIG. 1), nonlinear compression (c of FIG. 1), or the like. For example, Japanese Patent Laid-Open No. 2003-283846 discloses a method of dividing into a region in which colors are maintained, and that in which colors are not maintained, and compressing saturation levels using different conversion lines for these regions.

However, when the linear compression (a of FIG. 1) is done, a low-saturation part especially suffers a saturation drop, and an output image with satisfactory tint cannot be obtained. This is because the human visual sense characteristics are sensitive to a change in saturation of a low-saturation region but are insensitive to a change in saturation of a high-saturation region. Also, the compression based on region division disclosed in Japanese Patent Laid-Open No. 2003-283846 produces discontinuous points and generates a pseudo contour in an output image like in the linear compression based on zone division (b of FIG. 1). Also, in order to implement the nonlinear compression (c in FIG. 1), a conversion curve must be obtained using complicated mathematical formulas or by connecting a plurality of points manually adjusted by the user via a spline curve, and the conversion curve cannot be automatically and uniquely obtained.

SUMMARY OF THE INVENTION

The first aspect of the present invention discloses a color processing method, comprising the steps of: calculating first boundary point data, which indicates a first boundary point of a source gamut in a line passing a sample point in the source gamut, and calculating a second boundary point of a destination gamut; calculating a color difference between the first and second boundary points on the basis of a visual characteristic; calculating a ratio between saturation of the sample point and saturation of the first boundary point data; and correcting the saturation of the sample point based on the color difference and the ratio to map the sample point into the destination gamut.

According to the present invention, a color conversion table can be generated in consideration of the human visual sense characteristics.

Further, according to the present invention, a conversion curve required to nonlinearly compress the color gamut can be automatically and uniquely obtained.

Furthermore, according to the present invention, when image data undergoes gamut mapping using a color conversion table that nonlinearly converts the color gamut, a saturation drop of a low-saturation part can be prevented, and an output image with satisfactory tint can be obtained.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 shows a description format of gamut data;

FIG. 16 shows an example of gamut data;

DESCRIPTION OF THE PREFERRED EMBODIMENTS

Image processing according to preferred embodiments of the present invention will be described in detail hereinafter with reference to the accompanying drawings.

First Embodiment

Figure 2:
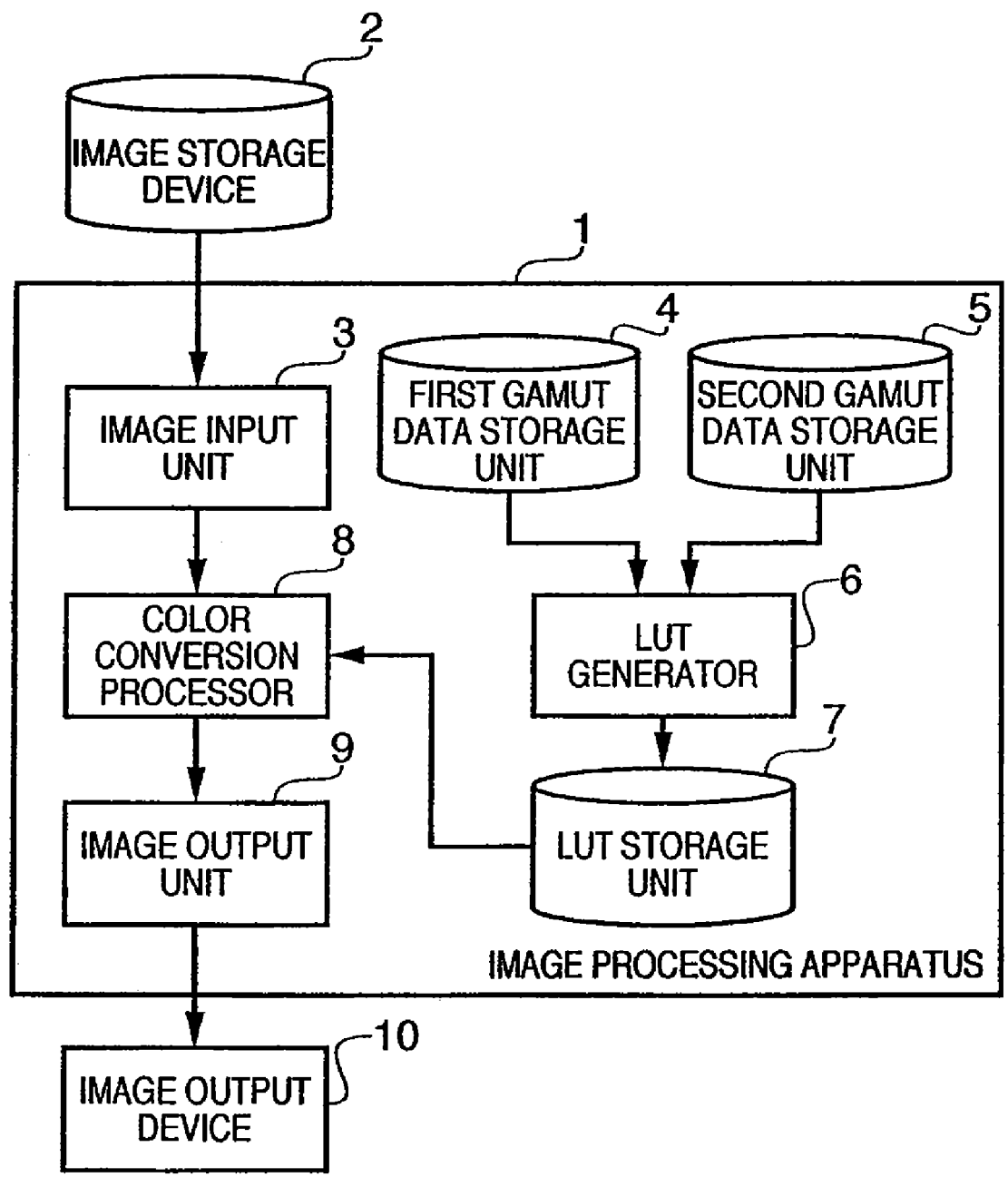
FIG. 2 is a block diagram showing the arrangement of an image processing apparatus according to the first embodiment of the present invention.

FIG. 2 is a block diagram showing the arrangement of an image processing apparatus 1 according to the first embodiment of the present invention.

A first gamut data storage unit 4 stores gamut data of a first image device, and a second gamut data storage unit 5 stores that of a second image device. A lookup table (LUT) generator 6 generates an LUT used to map the colors of a color gamut of the first image device onto those of a color gamut of the second image device using the first and second gamut data stored in the first and second gamut data storage units 4 and 5. The generated LUT is stored in an LUT storage unit 7. Note that the first and second gamut data storage units 4 and 5, and the LUT storage unit 7 are assured on predetermined areas of a nonvolatile memory such as a hard disk or the like.

An image input unit 3 reads image data from an image storage device 2, which drives a storage medium that stores image data, such as a hard disk drive, an optical disk drive (e.g., a CD-ROM drive), a memory card reader, or the like. Note that the image input unit 3 can use a serial bus interface such as Universal Serial Bus (USB), IEEE1394, and the like. Of course, an image input device such as a digital camera, scanner, or the like may be connected to the image input unit 3 in place of the image storage device 2 so as to read image data.

A color conversion processor 8 applies color conversion processing to image data read by the image input unit 3 using the LUT stored in the LUT storage unit 7. Note that the color conversion processor 8 may be implemented by supplying an image processing program to a CPU and making the CPU execute image processing using a RAM as a work memory. That image processing program may be stored in, e.g., a predetermined area of the hard disk which forms the LUT storage unit 7.

An image output unit 9 outputs image data which has undergone the color conversion processing by the color conversion processor 8 to an image output device 10. Note that the image output unit 9 may use a serial bus interface such as USB, IEEE1394, and the like as in the image input unit 3.

The image output device 10 is an image output device such as an ink-jet printer, laser beam printer, or the like, which prints an image on a print sheet or the like on the basis of image data output from the image output unit 9.

[Color Conversion Processing]

Figure 3:
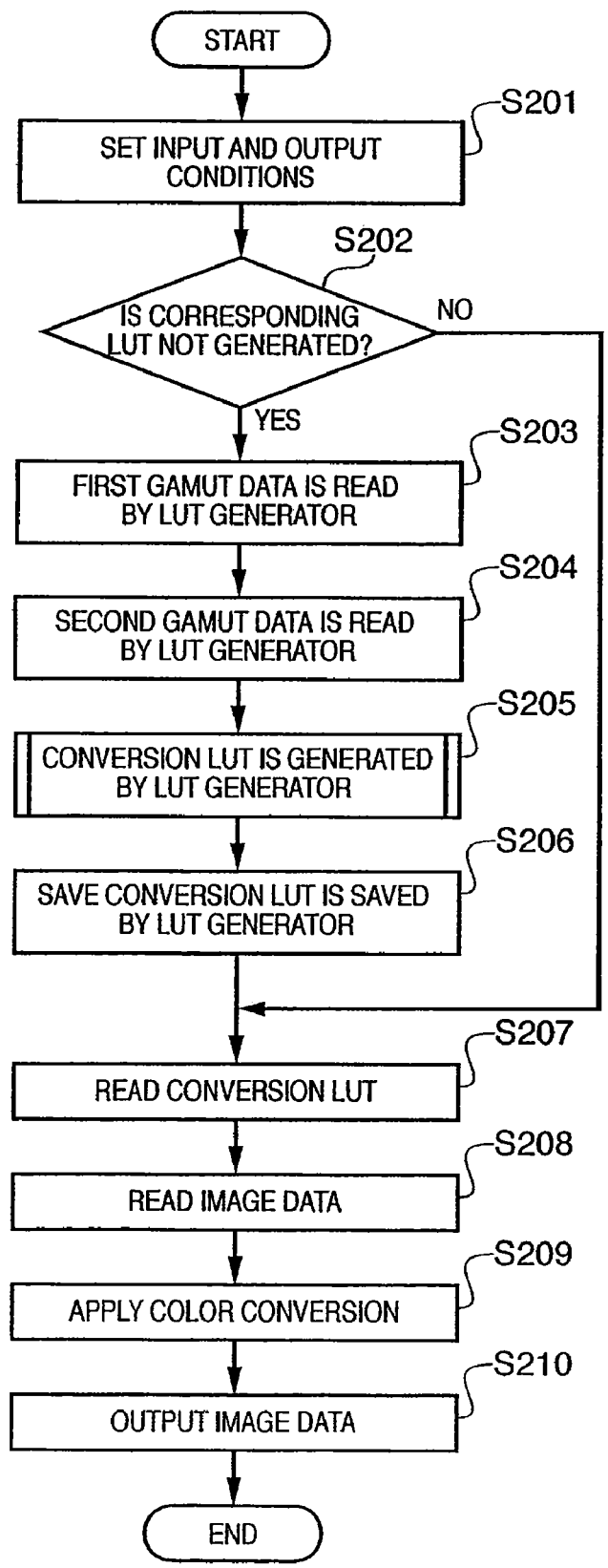
FIG. 3 is a flowchart showing color conversion processing to be executed by a color conversion processor.

FIG. 3 is a flowchart showing the color conversion processing to be executed by the color conversion processor 8.

When the user instructs to print image data stored in the image storage device 2 via a control panel or user interface (not shown), the color conversion processor 8 displays the next setting window on the control panel or user interface (S201). One setting window is used to set, as input conditions, the model of the first image device and its input mode (if necessary) (for example, the color space of image data: sRGB, AdobeRGB, or the like). The other setting window is used to set the output conditions (a type of print sheets, print mode, and the like) of the image output device 10 as the second image device.

The first image device is an image input device which generates image data to be printed. In some cases, information of the image input device is often recorded in the header or the like of image data. In such case, the color conversion processor 8 checks the header or the like of image to be printed via the image input unit 3 to identify the model and input mode of the first image device and to set the input conditions. In this case, the color conversion processor 8 need not display the input condition setting window or may display a confirmation window that makes the user confirm the information of the first image device in place of the setting window.

After the input and output conditions are set, the color conversion processor 8 checks if a conversion LUT corresponding to the input and output conditions set by the user has already been generated, and is stored in the LUT storage unit 7 (S202). If the LUT has already been generated, the flow jumps to step S207.

If the conversion LUT corresponding to the input and output conditions has not been generated yet, the color conversion processor 8 controls the LUT generator 6 to load first gamut data (gamut data of a source) which is stored in the first gamut data storage unit 4 and matches the input conditions (S203). Furthermore, the processor 8 controls the LUT generator 6 to load second gamut data (gamut data of a destination) which is stored in the second gamut data storage unit 5 and matches the output conditions (S204). Then, the processor 8 controls the LUT generator 6 to generate a conversion LUT using the first and second gamut data (S205), and to store the generated conversion LUT in the LUT storage unit 7 (S206).

Then, the color conversion processor 8 reads the conversion LUT which is stored in the LUT storage unit 7 and corresponds to the input and output conditions (S207), and reads image data to be printed from the image storage device 2 via the image input unit 3 (S208). The color conversion processor 8 performs color conversion processing of the read image data using the conversion LUT (S209), and outputs the image that has undergone the color conversion processing to the image output device 10 via the image output unit 9 (S210).

[Gamut Data]

FIG. 4 shows a description format of gamut data.

In general, an image output device has a device-dependent color space called a device RGB space, and develops colors corresponding to device RGB values. Pairs of device RGB values and Lab values obtained by measuring colors corresponding to the device RGB values are listed, as shown in FIG. 4, thus obtaining gamut data of the image output device. Especially, by describing all points or discrete points obtained by sampling at equal intervals within the ranges that device RGB values can assume, a color gamut of an arbitrary device on a device-independent color space can be described. When each of R, G, and B values is defined by 8 bits, the ranges that device RGB values can assume fall within the ranges $0 \leq R \leq 255$, $0 \leq G \leq 255$, and $0 \leq B \leq 255$.

Likewise, when a color having given Lab values is input to the image input device, the image input device outputs given device RGB values. Therefore, when Lab values and device RGB values are listed, as shown in FIG. 4, gamut data of the image input device can be obtained.

However, the gamut data used in the first embodiment is not limited to the description format shown in FIG. 4. For example, the type of device and colorimetric conditions may be added to a header, and a color space other than the device RGB space such as a CMYK space or the like may be used as the device-dependent color space. That is, the description format is not particularly limited as long as it can describe the color gamut of a device.

[Generation of Conversion LUT]

Figure 5:
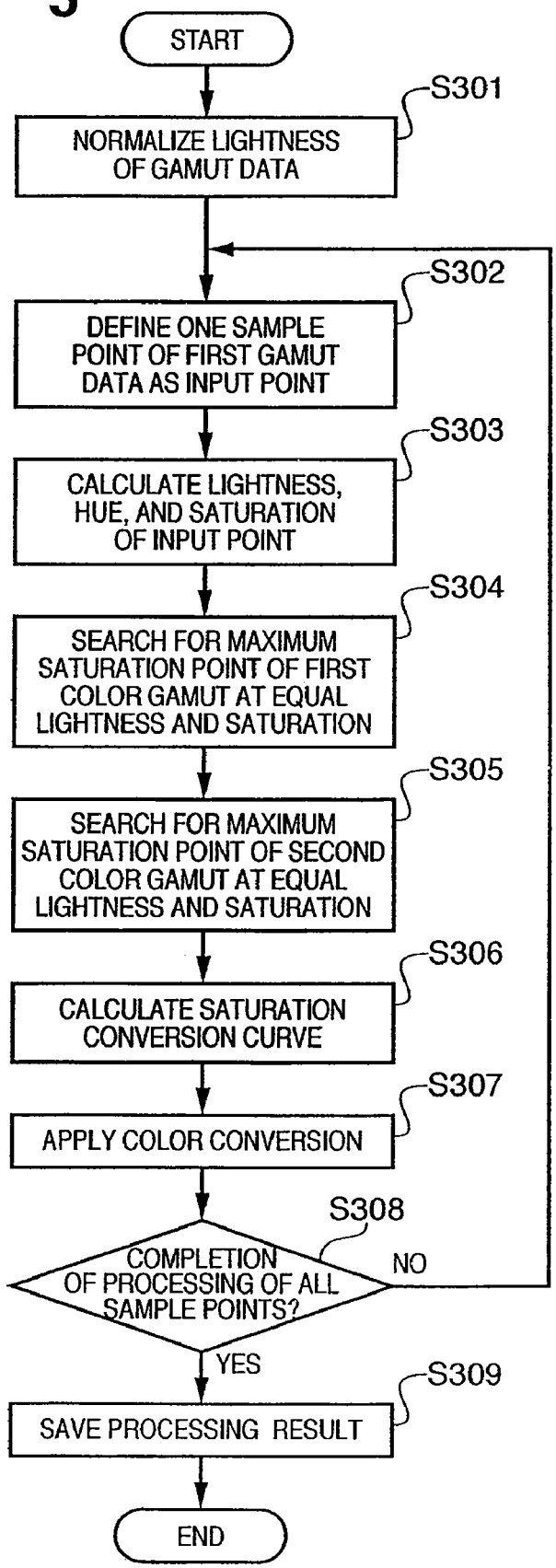
FIG. 5 is a flowchart showing generation processing of a conversion LUT.

FIG. 5 is a flowchart showing the generation processing (S205) of the conversion LUT.

Firstly, the lightness range of the first gamut and the lightness range of the second gamut are matched. The lightness ranges of the first and second gamut data are normalized to the range from $L^*=0$ to 100, e.g., by:

$$\lambda'=\lambda \cdot 100/(L^*_{max}-L^*_{min}) \qquad (1)$$

where $\lambda$ is the lightness value before normalization,
$\lambda'$ is the lightness value after normalization,
$L^*_{max}$ is the maximum lightness value of the color gamut before normalization, and
$L^*_{min}$ is the minimum lightness value of the color gamut before normalization (S301).

Figure 6:
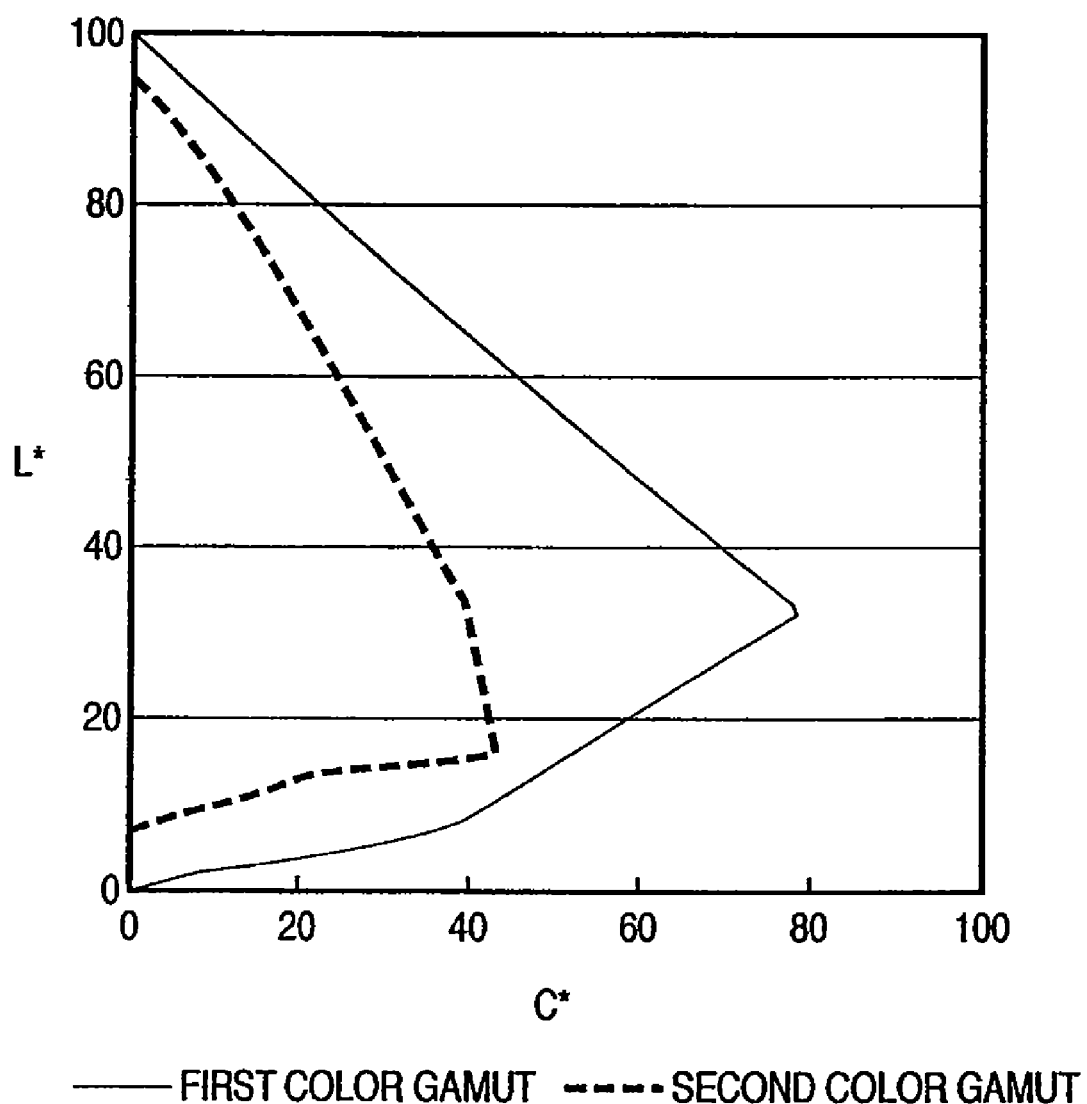
FIG. 6 is a graph showing an example of color gamuts at a given hue angle before normalization.
Figure 7:
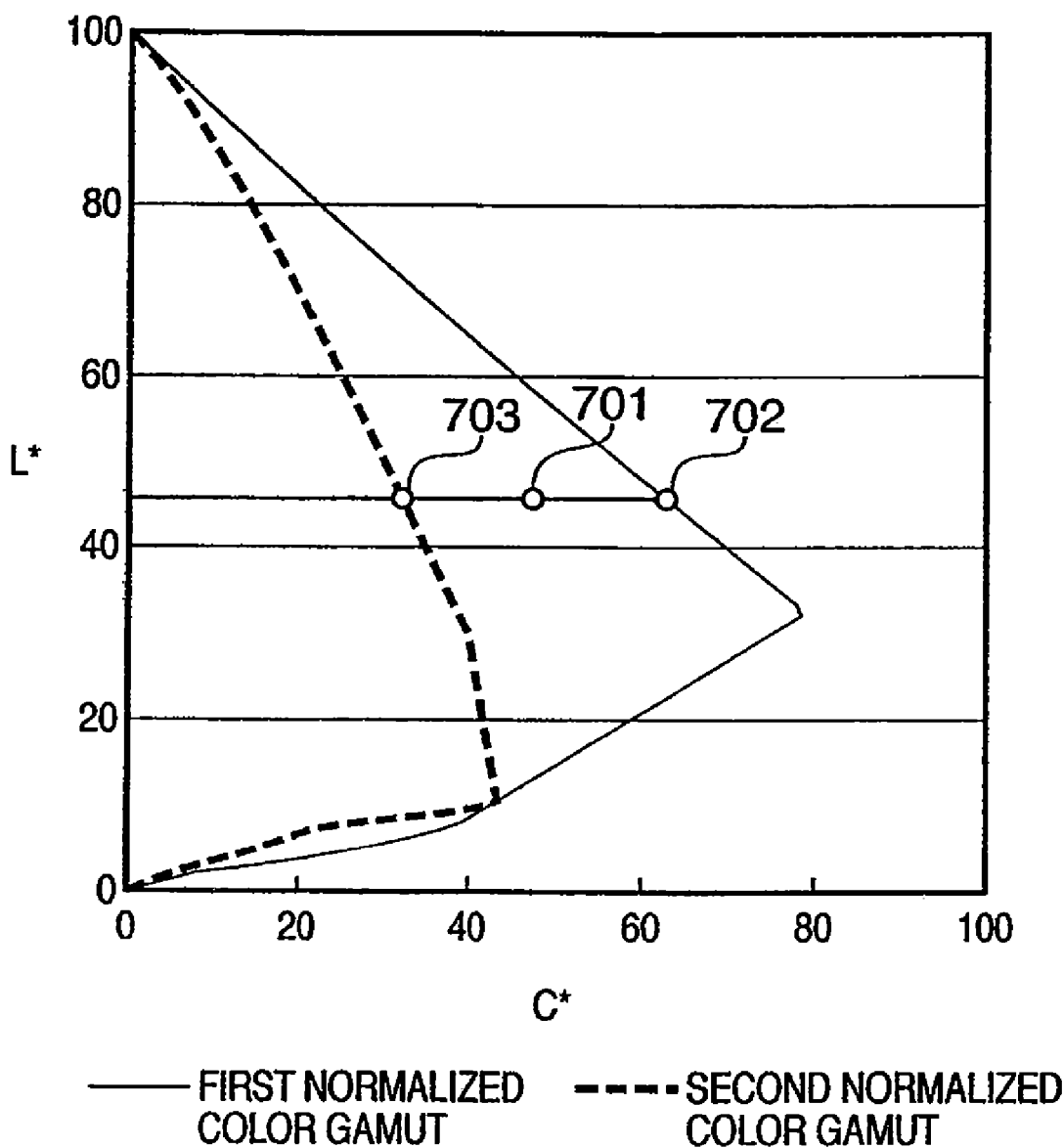
FIG. 7 is a graph showing an example of color gamuts at the given hue angle after normalization.

FIGS. 6 and 7 show the color gamuts at a given hue angle, in which FIG. 6 shows an example of the color gamuts before normalization, and FIG. 7 shows an example of the color gamuts after normalization.

Next, one of sample points of the first normalized gamut data is extracted and is defined as an input point (S302). The lightness, hue, and saturation values of that input point are calculated (S303). A highest saturation point in the first normalized color gamut at the calculated lightness and hue values is calculated from the first normalized gamut data (S304). Also, a highest saturation point in the second normalized color gamut at the calculated lightness and hue values is calculated from the second normalized gamut data (S305).

FIG. 7 shows an input point 701, and a maximum saturation point 702 of the first normalized color gamut and a maximum saturation point 703 of the second normalized color gamut at the lightness value equal to the input point 701. That is, boundary points of the first and second color gamuts, which have the same lightness and hue values as those of the input point, are calculated.

Next, as will be described in detail later, a saturation conversion curve is calculated using the calculated maximum saturation points 702 and 703 (S306), and a saturation value of an output point corresponding to that of the input point 701 is calculated using the saturation conversion curve (S307).

It is then checked if the processing is complete for all sample points of the first normalized gamut data (S308). If sample points to be processed still remain, the flow returns to step S302; otherwise, pairs of the input and output points of the processing results are saved in the LUT storage unit 7 in an LUT format (S309).

[Calculation of Boundary Point of Gamut]

A method of calculating the boundary points of the gamuts in steps S304 and S305 will be described in detail below.

In general, the gamut data stored in the first gamut data storage unit 4 or second gamut data storage unit 5 includes a list of RGB data which are allocated at grids at equal intervals, and output values (Lab values) corresponding to these RGB data, as shown in FIG. 16.

As for the aforementioned gamut data, the boundary of the color gamut is a set of points in each of which at least one data of R, G, and B points given by 8-bit data is 0 or 255. Therefore, a set of a triangle defined by neighboring three arbitrary grid points of those of the boundary of gamut specifies a boundary plane of the given gamut data.

FIGS. 17 to 22 show boundary planes when R=0, R=255, G=0, G=255, B=0, and B=255, respectively.

Figure 23:
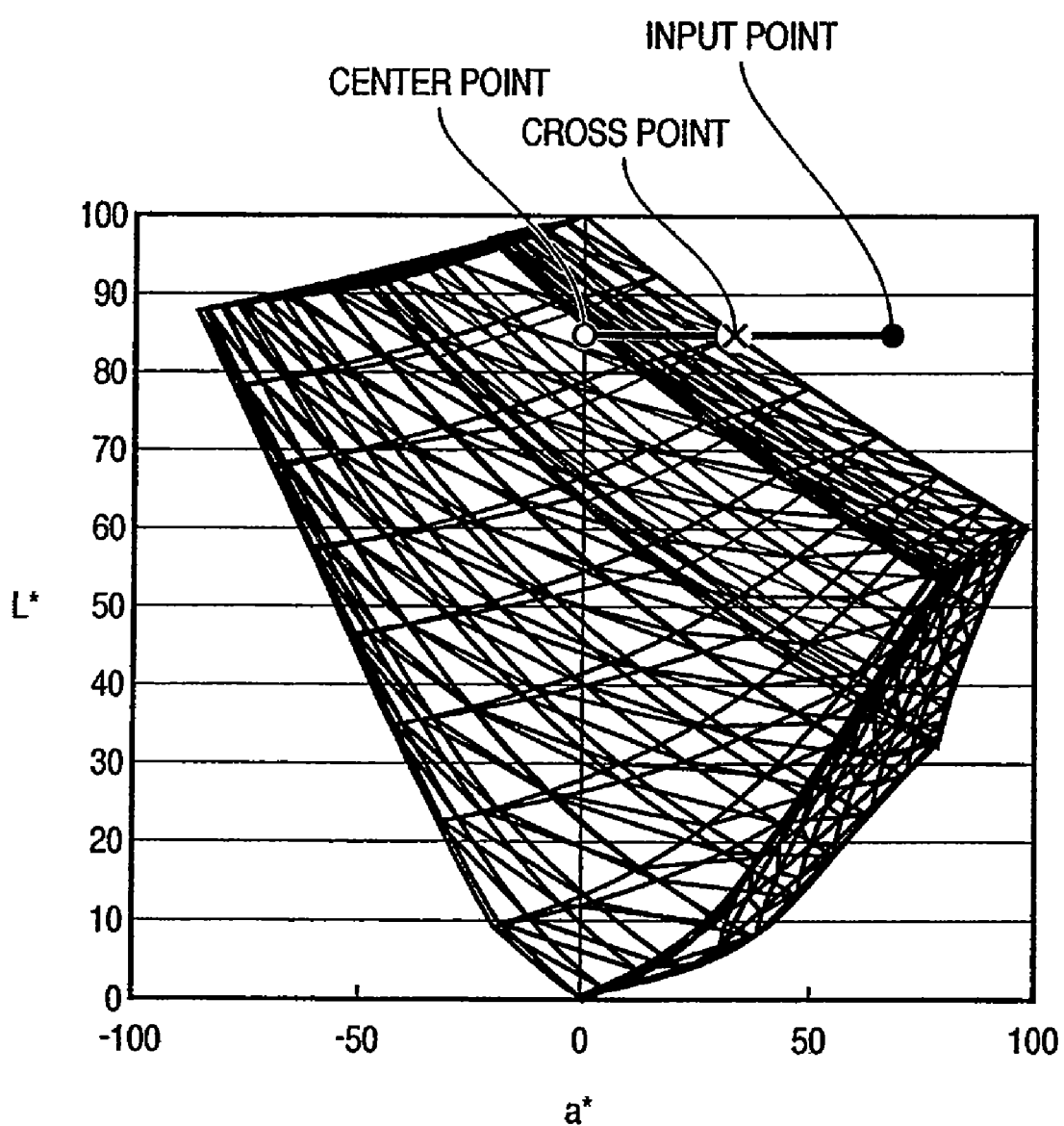
FIG. 23 is a graph for explaining a method of calculating boundary points.

As shown in FIG. 23, a line segment which connects the input point calculated in step S302 and a point (central point) which has the same lightness value as that of the input point and has zero saturation value is generated. By calculating an intersection at which this line segment intersects the boundary plane, a highest saturation point which has the same lightness value and the same hue angle as those of the input point in the given gamut data can be calculated.

[Calculation of Saturation Conversion Curve]

Let Cin be the saturation value of the input point 701 shown in FIG. 7, C1 be that of the maximum saturation point 702 in the first normalized gamut, and C2 be that of the maximum saturation point 703 in the second normalized gamut. Note that the lightness and hue of the maximum saturation point 702 is equal to the lightness and hue of the input point, and the lightness and hue of the maximum saturation point 703 is equal to the lightness and hue of the input point. Then, a saturation value Cout of the output point is given by:

$$Cout=(k2 \cdot Cin-\Delta E94_{in})/k1 \qquad (2)$$

$$\text{for } k1=1+0.045/2 \times \Delta E94_{in}$$

$$k2=1-0.045/2 \times \Delta E94_{in}$$

$$\Delta E94_{in}=\Delta E94_{max} \cdot Cin/C1$$

$$\Delta E94_{max}=\sqrt{\{(C1-C2)/(1+0.045 \cdot C^*)\}^2}$$

Note that $\Delta E94_{max}$ indicates a color difference between the maximum saturation points 702 and 703 in consideration of the visual characteristic. $\Delta E94_{in}$ is a value which is calculated by linear converting $\Delta E94_{max}$ using a ration between the saturation Cin of the input point and the maximum saturation point 702. Then the equation (2) compresses the input point into the second normalized gamut using $\Delta E94_{in}$.

Figure 8:
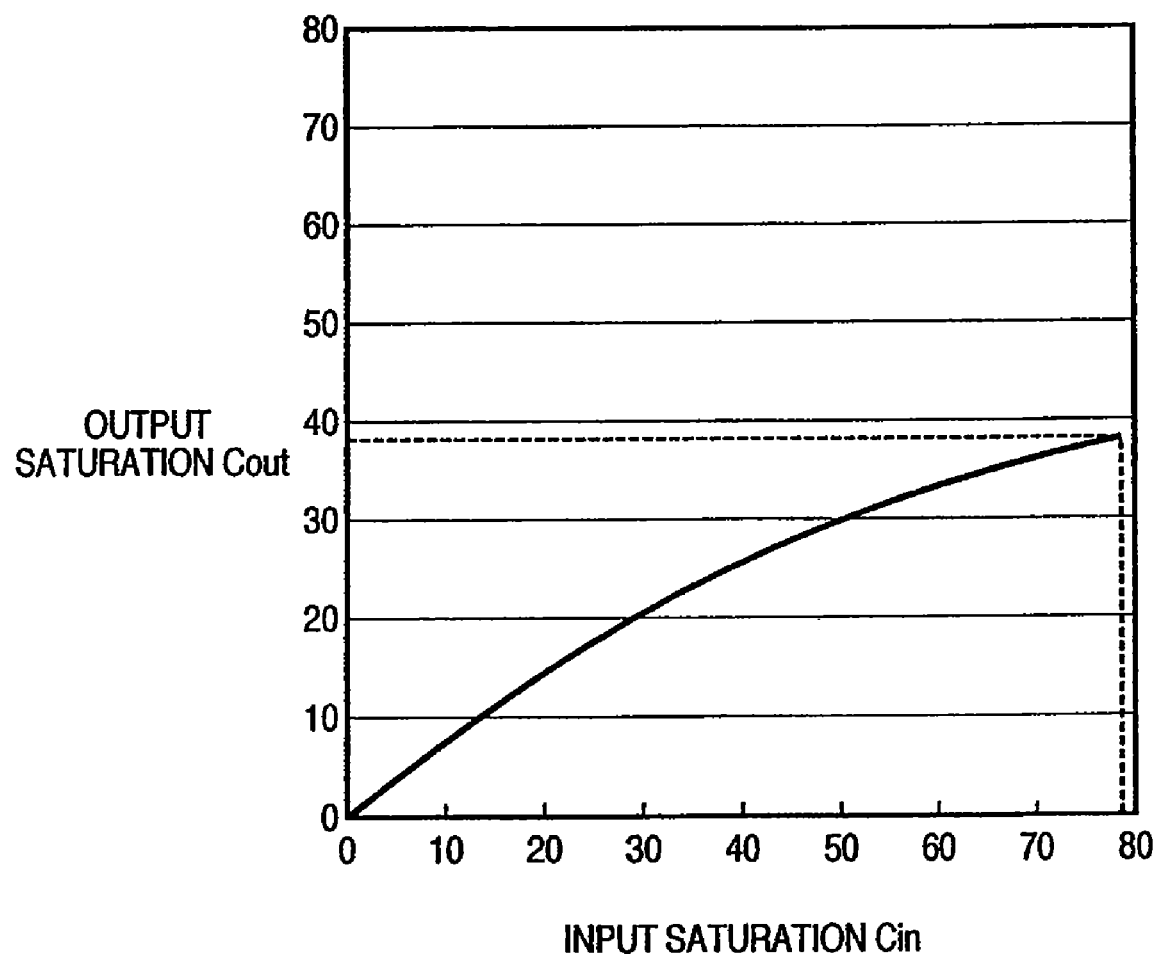
FIG. 8 is a graph showing the relationship between input and output saturation values.

FIG. 8 shows the relationship between the input and output saturation values given by equation (2). A color difference $\Delta E94$ between the input and output points increases with increasing saturation value of the input point. That is, by the above saturation conversion, the compression ratio of saturation is small in a low-saturation region close to achromatic color, and is large in a high-saturation region.

Therefore, the above saturation conversion implements nonlinear conversion of saturation in consideration of the human visual sense characteristics, which are sensitive to a change in saturation in the low-saturation region but are insensitive to a change in saturation in the high-saturation region. That is, compared to the linear compression (a of FIG. 1), an output image with satisfactory tint can be obtained. A problem of production of discontinuous point and generation of a pseudo contour in an output image caused by the linear compression based on zone division (b of FIG. 1) can be solved. Furthermore, the need for calculating a conversion curve using complicated mathematical formulas or by connecting a plurality of points manually adjusted by the user via a spline curve can be obviated, and the conversion curve, which compresses the saturation in accordance with the visual characteristic, can be automatically and uniquely calculated.

Note that color differences ΔE and ΔE94 between two colors (L1, a1, b1) and (L2, a2, b2) are calculated by:

$$\Delta E = \sqrt{\{(L1-L2)^2 + (a1-a2)^2 + (b1-b2)^2\}} \quad (3)$$

$$\Delta E94 = \sqrt{\{(L1-L2)^2 + \Delta C^2 + \Delta H^2\}} \quad (4)$$

for $\Delta C = \{\sqrt{(a1^2+b1^2)} - \sqrt{(a2^2+b2^2)}\}/(1+0.045 \cdot C^*)$ $\Delta H = \sqrt{\{\Delta E^2 - \Delta C^2 - (L1-L2)^2\}}/(1+0.015 \cdot C^*)$ $C^* = \{\sqrt{(a1^2+b1^2)} - \sqrt{(a2^2+b2^2)}\}/2$ Note that ΔE94 is the expression of a color difference in consideration of the visual characteristic.

Figure 1:
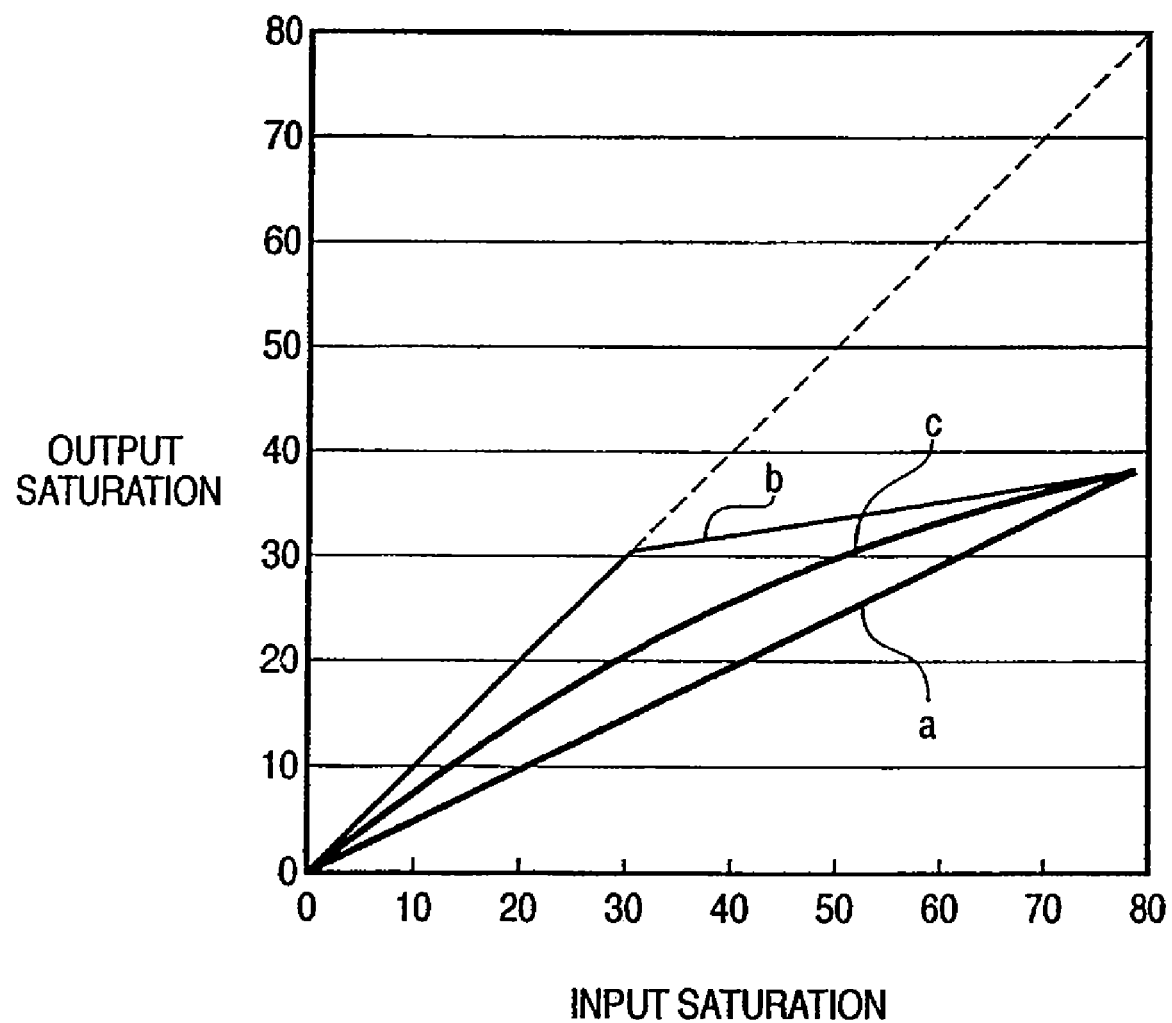
FIG. 1 is a graph showing the compression methods of a color gamut.
Figure 9:
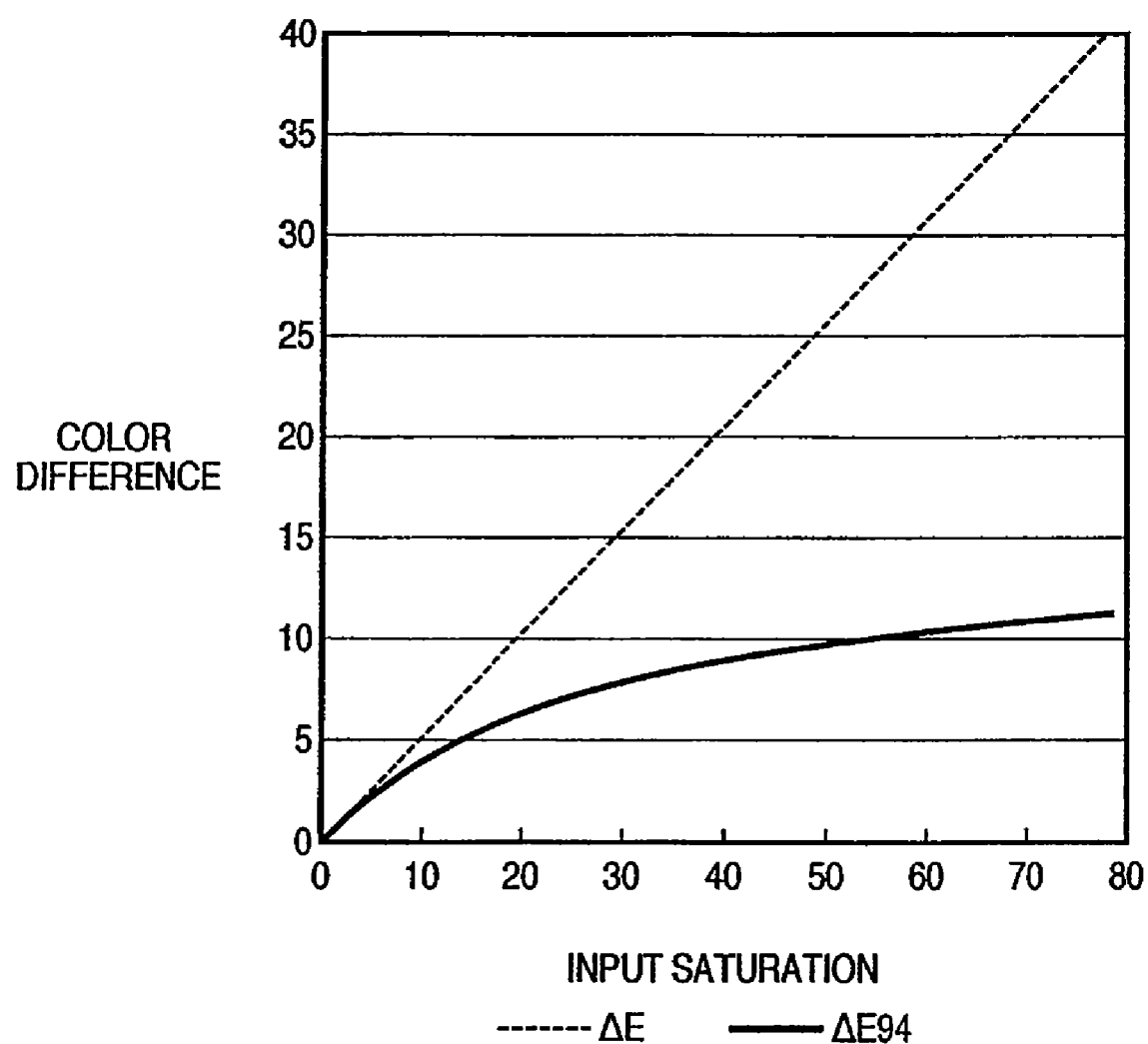
FIG. 9 is a graph showing a color difference between the input and output saturation values with respect to the input saturation value in linear compression.
Figure 10:
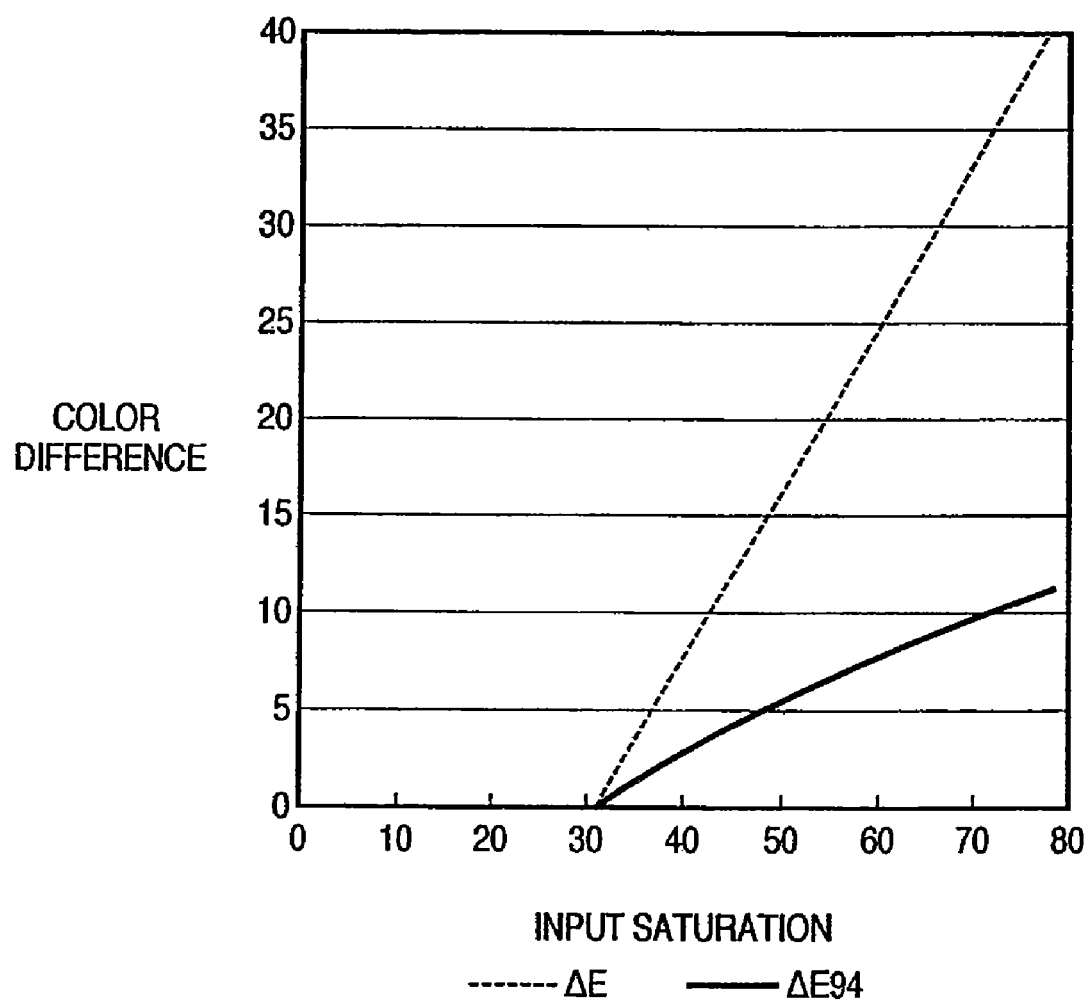
FIG. 10 is a graph showing a color difference between the input and output saturation values with respect to the input saturation value in linear compression based on zone division.
Figure 11:
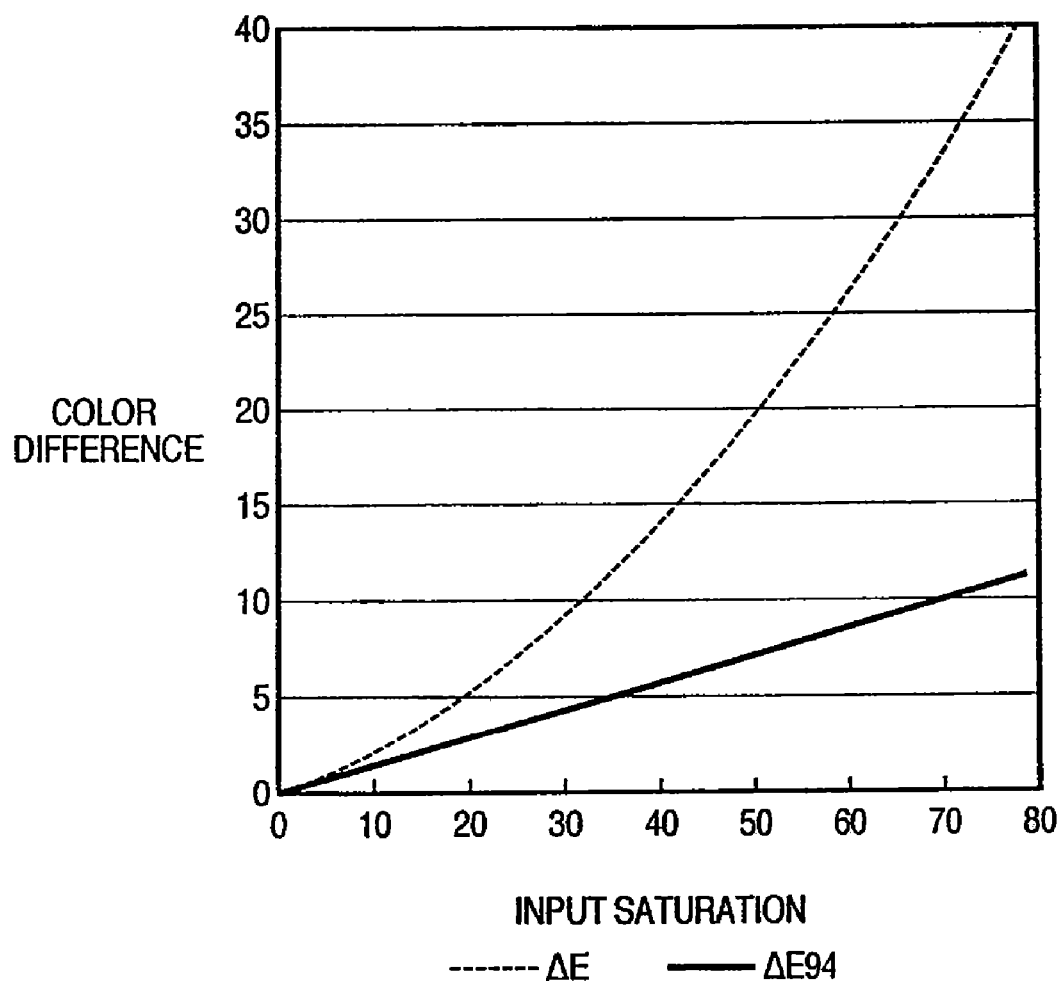
FIG. 11 is a graph showing a color difference between the input and output saturation values with respect to the input saturation value in nonlinear compression.
Figure 12:
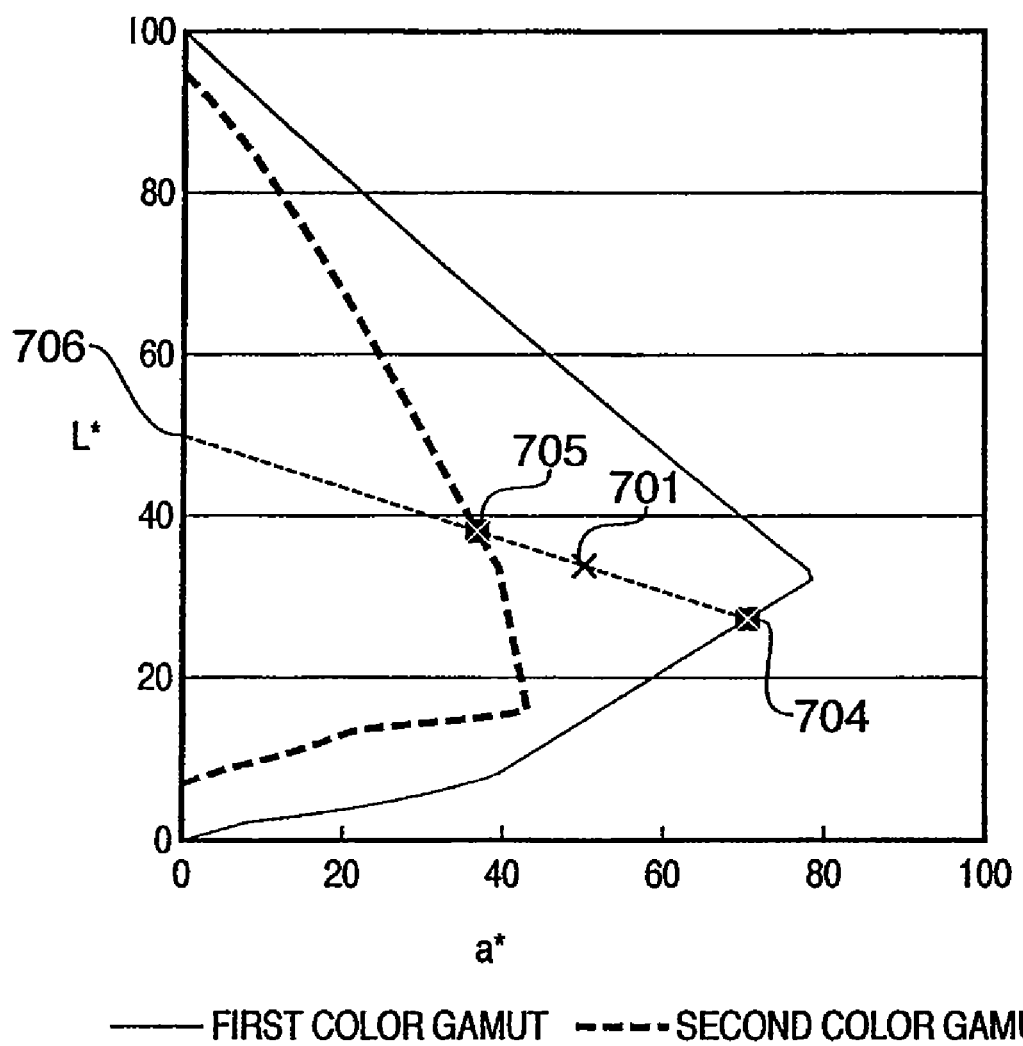
FIG. 12 is a graph for explaining a calculation of a conversion curve when a lightness value is not normalized.

FIGS. 9 to 11 respectively show the color differences (ΔE and ΔE94) between the input and output saturation values with respect to the input saturation value in the linear compression (corresponding to a of FIG. 1), linear compression based on zone division (corresponding to b of FIG. 1), and nonlinear compression (corresponding to c of FIG. 1). In case of the linear compression shown in FIG. 9, ΔE changes linearly, but a low-saturation part of ΔE94 changes steeply. That is, FIG. 9 indicates a considerable saturation drop in the low-saturation part. In case of the linear compression based on zone division shown in FIG. 10, since both the changes in ΔE and ΔE94 have inflection points in middle-saturation parts, they cause image deteriorations such as a pseudo edge, tone jump, and the like. Furthermore, in case of the nonlinear compression (the above saturation conversion is also nonlinear compression) shown in FIG. 11, a change in ΔE94 which has high correlation to the visual sense characteristics is linear from a low-saturation part to a high-saturation part, and satisfactory saturation compression is done.

The point of the first embodiment is compression in the saturation direction, and the compression method of lightness is not particularly limited. Also, normalization of lightness (S301) is not particularly limited as long as processing for absorbing the differences between maximum and minimum lightness values of the first gamut data and those of the second gamut data can be implemented.

Also, normalization of lightness may be omitted. In this case, an arbitrary convergence point 706 is set on the lightness axis upon compressing saturation (normally, the point 706 is set at the center of a lightness dynamic range of the second color gamut). Then, by calculating a conversion curve to have, as C1 and C2 in equation (2), saturation values of intersections 704 and 705 between a straight line that connects the input point 701 and convergence point 706, and the boundary of the respective color gamuts, lightness can also be compressed.

In this manner, upon mapping image data of the first color gamut of the image input device onto the second color gamut of the image output device, the saturation conversion curve (or lightness-saturation conversion curve) that implements nonlinear compression in consideration of the human visual sense characteristics can be automatically and uniquely calculated.

Second Embodiment

Image processing according to the second embodiment of the present invention will be described below. Note that the same reference numerals in the second embodiment denote the same parts as those in the first embodiment, and a detailed description thereof will be omitted.

Figure 13:
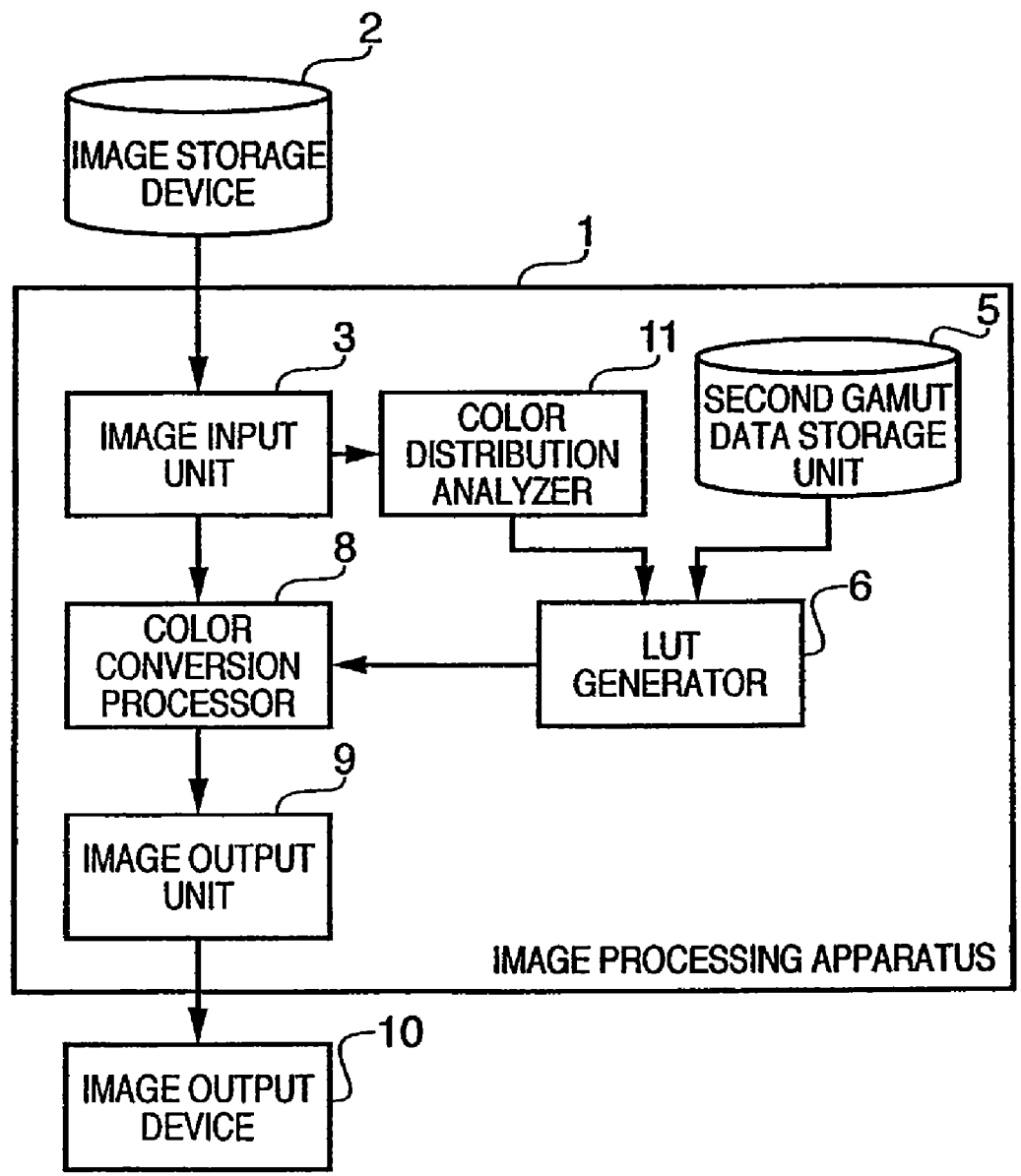
FIG. 13 is a block diagram showing the arrangement of an image processing apparatus according to the second embodiment of the present invention.

FIG. 13 is a block diagram showing the arrangement of an image processing apparatus according to the second embodiment of the present invention.

A color distribution analyzer 11 analyzes the color distribution of image data input by the image input unit 3, and outputs that color distribution to the LUT generator 6 as first gamut data. In the second embodiment, since a conversion LUT changes for each input image data, no arrangement for saving the conversion LUT generated by the LUT generator 6 is equipped. However, in consideration of a case wherein a series of images are to be converted using a single conversion LUT, the generated LUT may be saved in a memory such as a RAM, hard disk, or the like.

Figure 14:
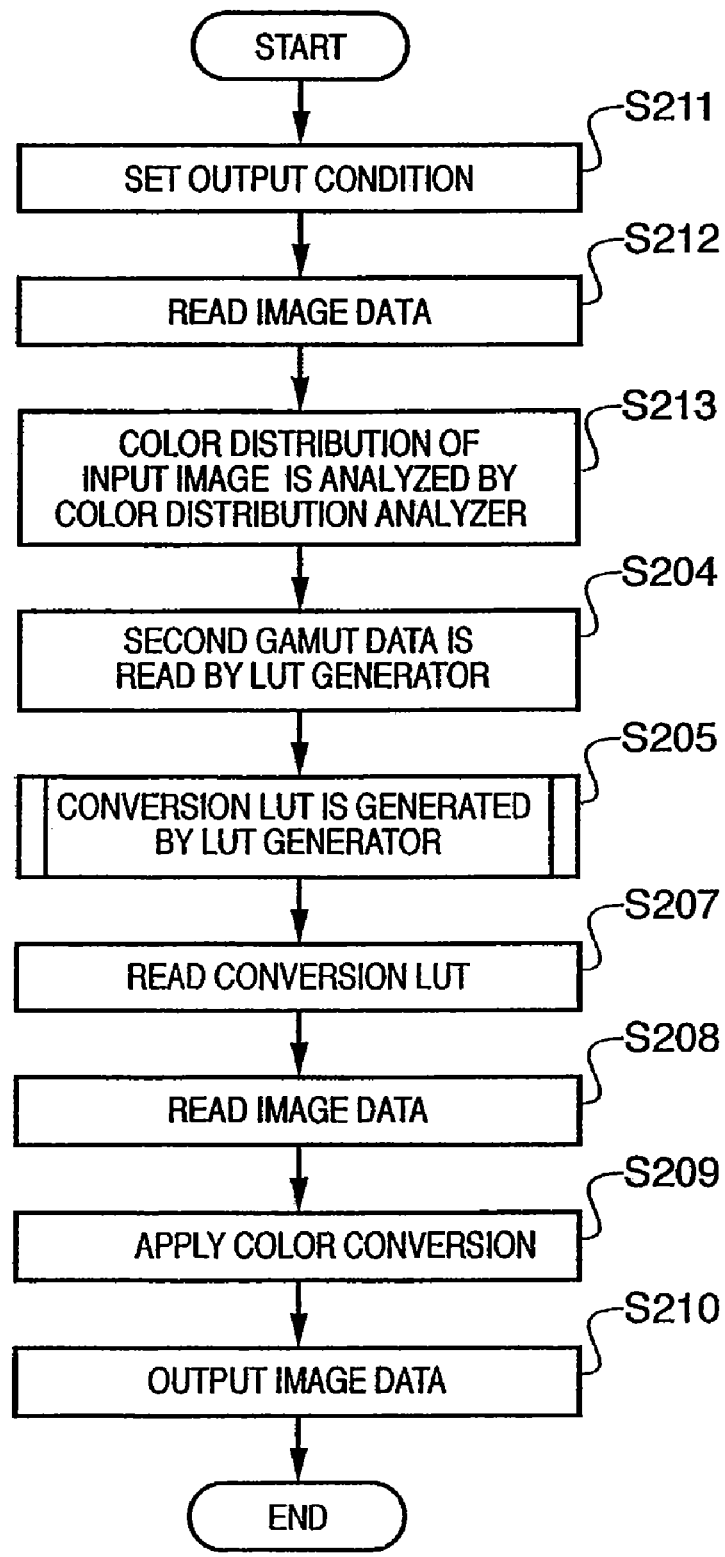
FIG. 14 is a flowchart showing color conversion processing to be executed by a color conversion processor according to the second embodiment.

FIG. 14 is a flowchart showing the color conversion processing to be executed by the color conversion processor 8.

When the user instructs to print image data stored in the image storage device 2 via a control panel or user interface (not shown), the color conversion processor 8 displays a setting window on the control panel or user interface (S211). With this setting window, the user can set output conditions (the type of print sheet, print mode, and the like) of the image output device 10 as the second image device.

After the output conditions are set, the color conversion processor 8 reads image data to be printed from the image storage device 2 via the image input unit 3 (S212), and controls the color distribution analyzer 11 to analyze the color distribution of the input image data (S213). The color distribution analyzer 11 analyzes the color distribution, sets a first color gamut based on the analysis result, and outputs first gamut data to the LUT generator 6.

Since the subsequent processing steps (S204 to S210) are the same as those described in FIG. 3, a detailed description thereof will be omitted.

Figure 15:
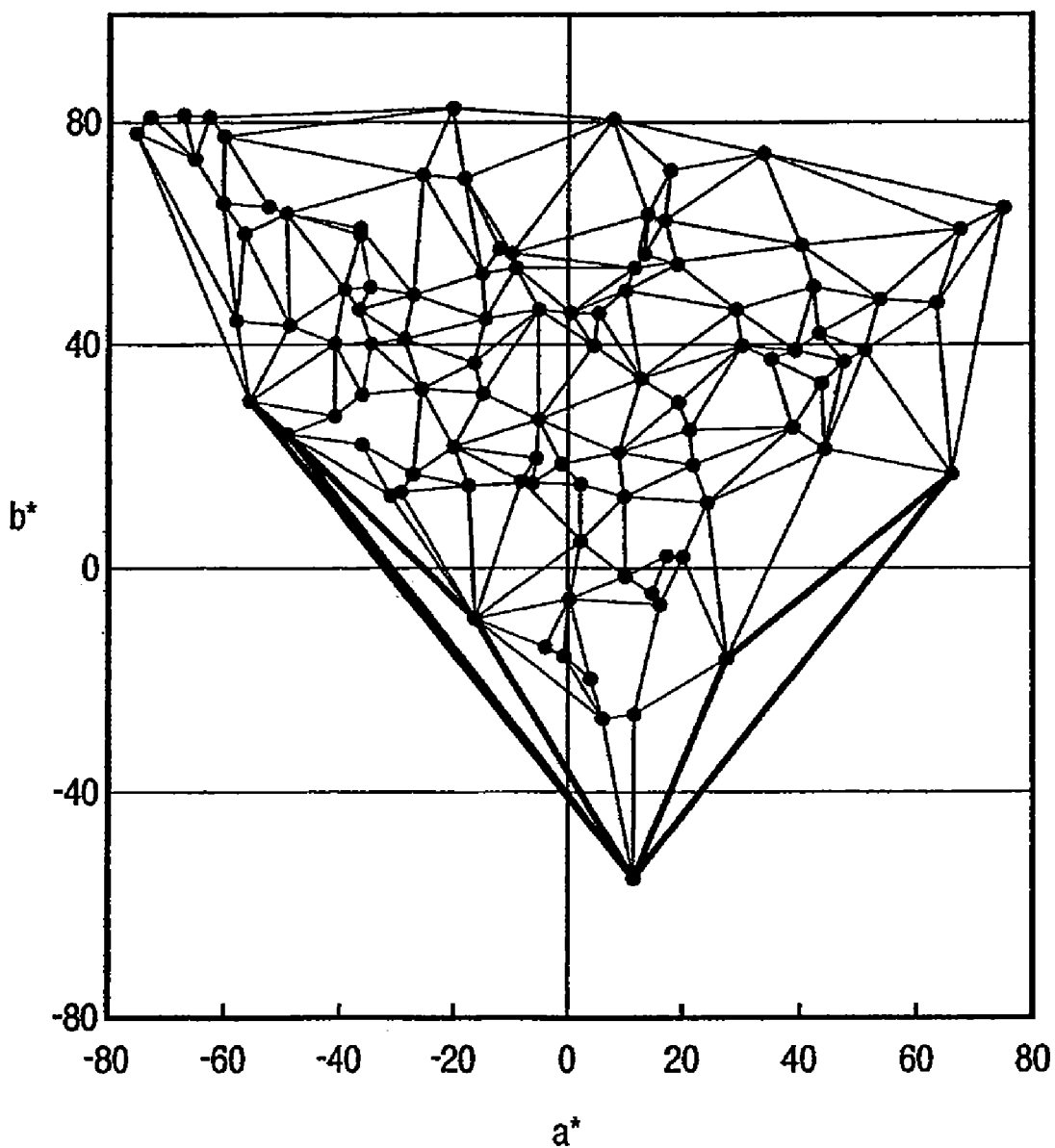
FIG. 15 is a graph for explaining the processing to be executed by a color distribution analyzer.
Figure 17:
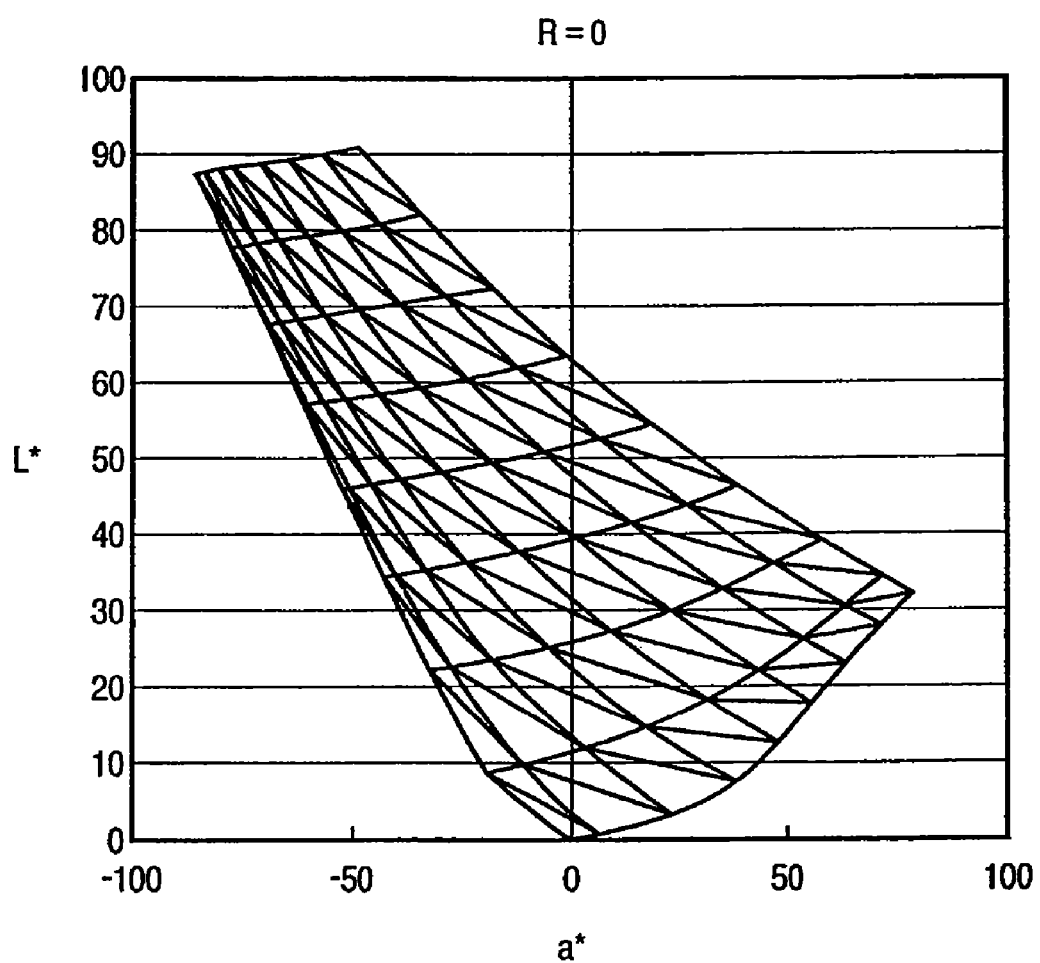
FIG. 17 is a graph showing an example of a boundary plane when R=0.
Figure 18:
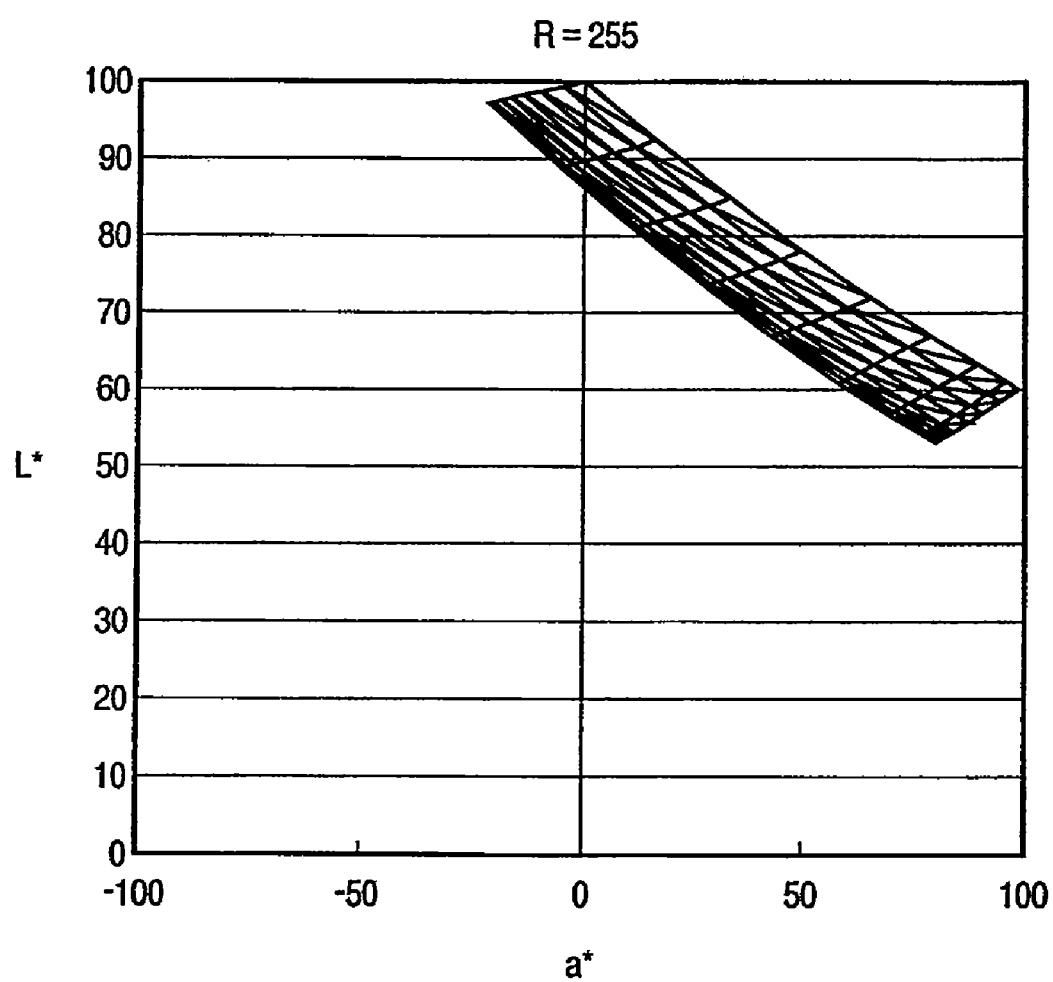
FIG. 18 is a graph showing an example of a boundary plane when R=255.
Figure 19:
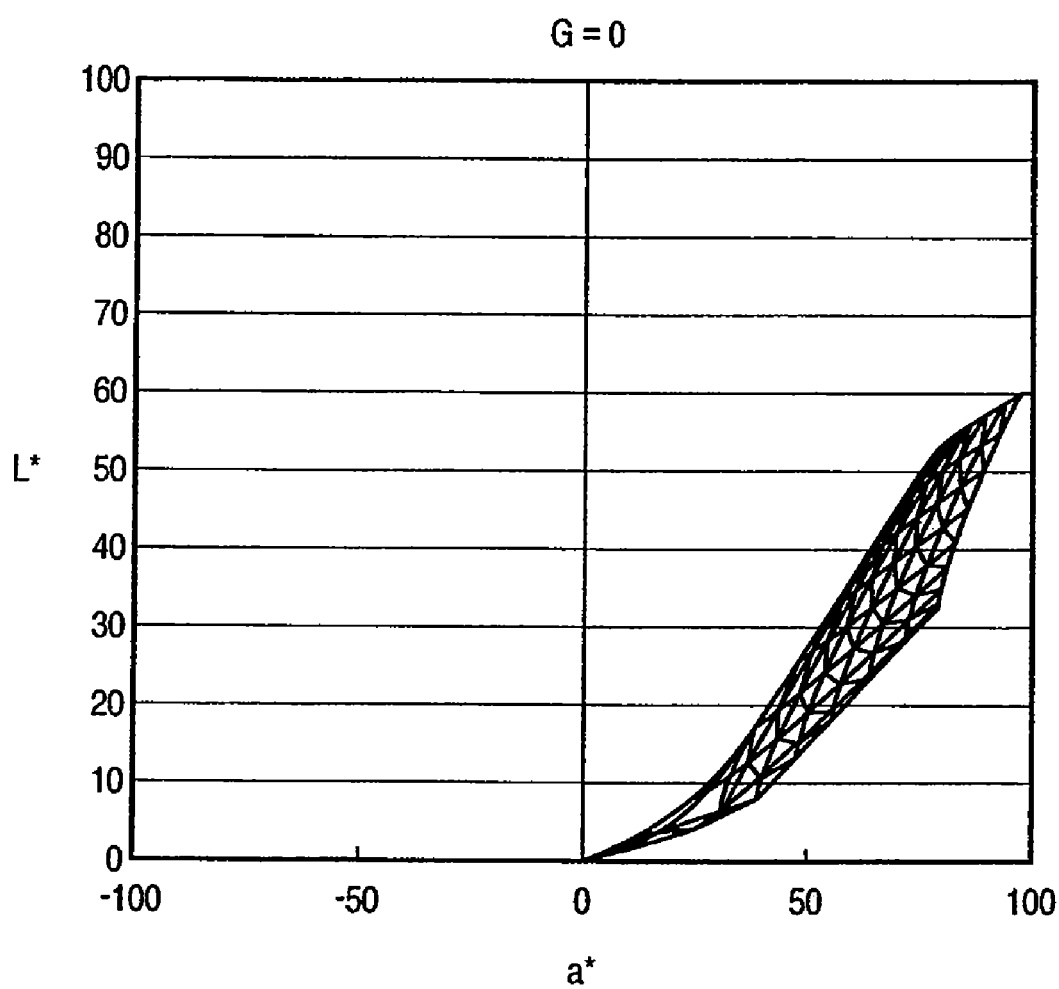
FIG. 19 is a graph showing an example of a boundary plane when G=0.
Figure 20:
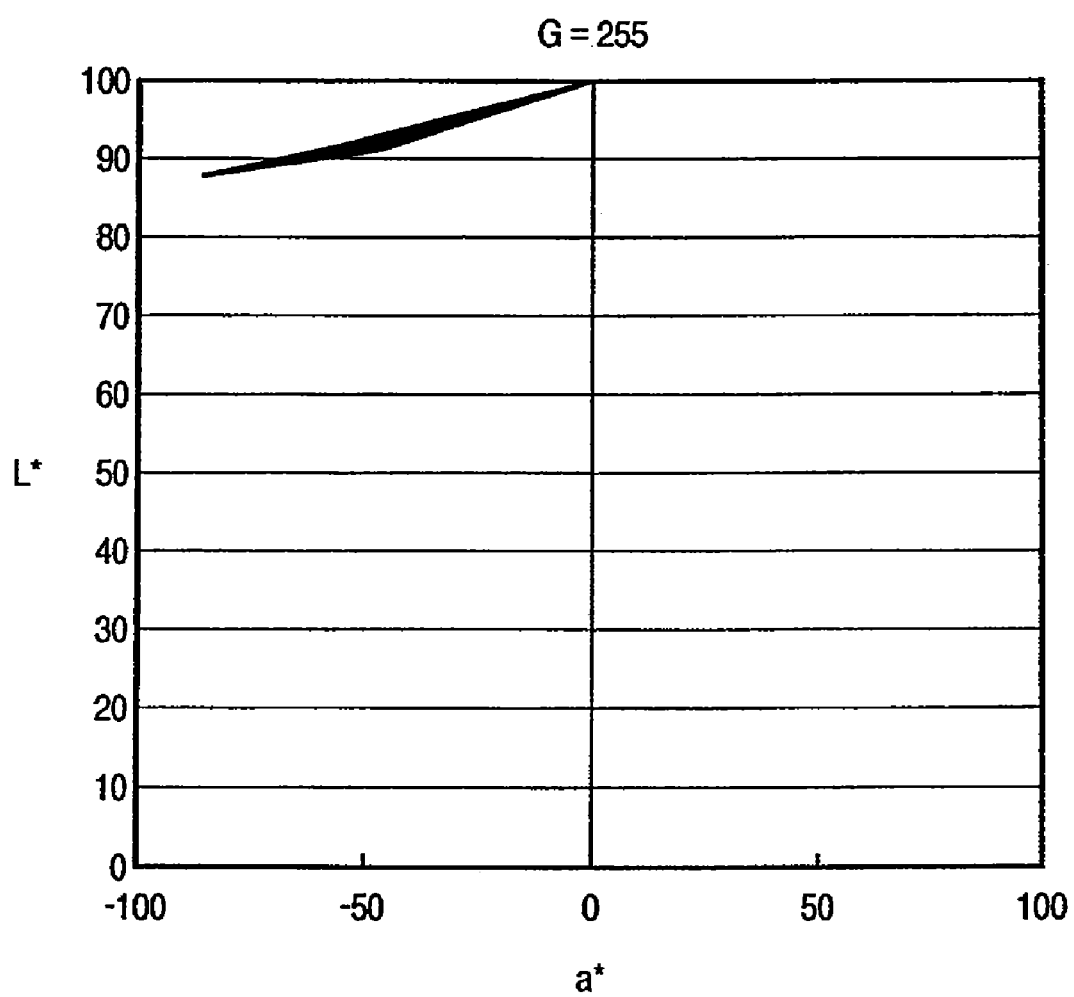
FIG. 20 is a graph showing an example of a boundary plane when G=255.
Figure 21:
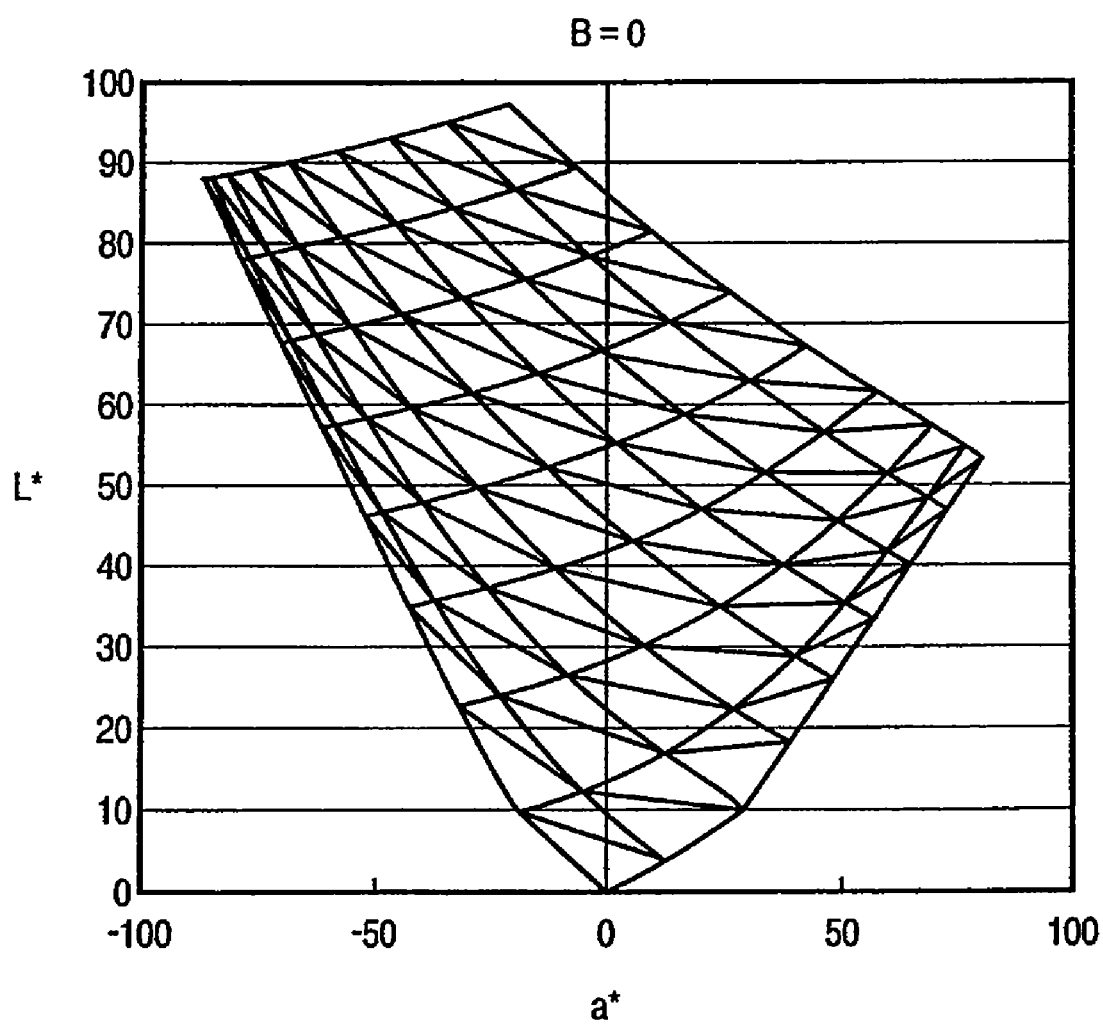
FIG. 21 is a graph showing an example of a boundary plane when B=0.
Figure 22:
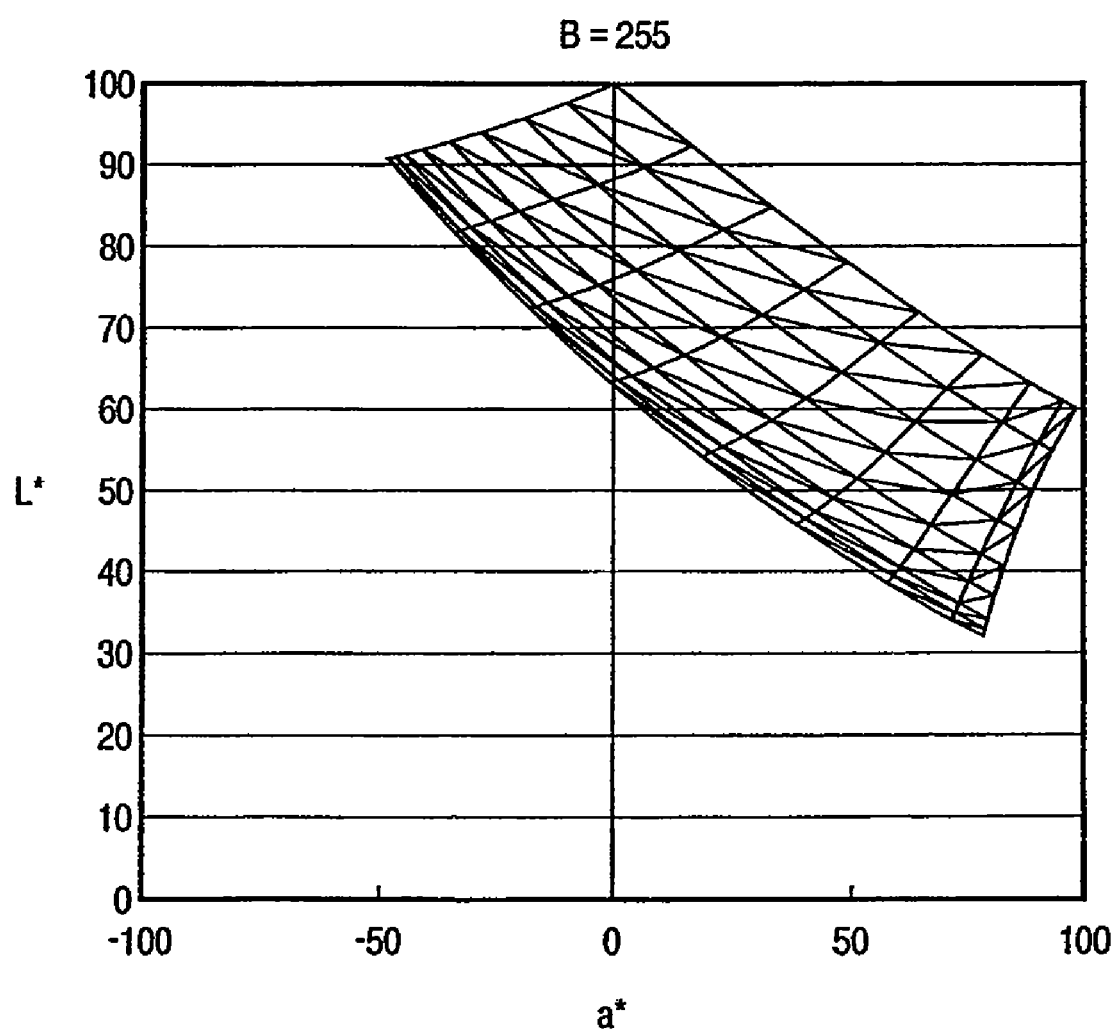
FIG. 22 is a graph showing an example of a boundary plane when B=255.

FIG. 15 is a graph for explaining the processing to be executed by the color distribution analyzer 11, i.e., a graph showing a state wherein a color gamut is set based on the color distribution of input image data. Note that the color gamut is expressed by an a*b* plane for the sake of simplicity.

Closed circles ● shown in FIG. 15 indicate distribution points of input image data, and form a plurality of triangles having neighboring distribution points as vertices. These triangles do not include any distribution points. By combining all triangles, a polygon that includes input points is obtained. In general, each of the above triangles is called a Delaunay triangle. By setting the polygon obtained in this way as a color gamut, gamut data of the input image data can be obtained.

As described above, according to the second embodiment, in addition to the same effects as in the first embodiment, even when the color gamut of input image data is unknown, the first gamut data can be set based on the input image data, and gamut mapping processing can be executed using the gamut data.

Modification of Embodiments

In the description of the above examples, after the print instruction of image data is issued, the conversion LUT is generated inside the image processing apparatus 1. Alternatively, for example, conversion LUTs may be generated by the aforementioned method, and may be saved in the LUT storage unit 7. Then, a conversion LUT which matches the input and output conditions or corresponds to the output conditions and the color distribution of image data may be loaded to the color conversion processor 8. That is, the generation timing of the color conversion LUT is not particularly limited as long as it is generated by the aforementioned method.

In the description of the above examples, the CIELab space is used as a device-independent color space. For example, a JCH space in CIECAM02 as a color appearance space may be used. That is, the types of device-independent color spaces are not particularly limited as long as color spaces independent from devices are used.

In the above examples, the processing for mapping the color gamut of the image input device onto that of the image output device has been described. However, the aforementioned mapping processing can also be applied to a case wherein an image displayed on an image display device such as a monitor or the like is to be output to the image output device like in computer graphics. In this case, the color gamut of the image display device is set as the first color gamut, and that of the image output device is set as the second color gamut.

The expression in consideration of the visual characteristic is not limited to ΔE94 described in the equation (4). That is, the other expression, which executes a weight operation in consideration of the visual characteristic, can be used.

Other Embodiments

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

When the present invention is applied to the storage medium, that storage medium stores program codes corresponding to the aforementioned flowcharts.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-071735, filed Mar. 14, 2005, which is hereby incorporated by reference herein in its entirety.

What is claimed is:

1. A color processing method of determining saturation compression based on a visual characteristic, comprising using a color processing apparatus to perform the steps of:

calculating first and second boundary points, wherein the first boundary point is an intersection point of a line passing a sample point in a source gamut and a boundary of the source gamut, and the second boundary point is an intersection point of the line and a boundary of a destination gamut;

calculating a saturation difference $\Delta C\text{max}$ from saturation $C1$ of the first boundary point and saturation $C2$ of the second boundary point by $$\Delta C\text{max}=\sqrt{\{(C1-C2)/(1+0.045C^*)\}^2};$$

calculating a saturation difference $\Delta C\text{in}$ from saturation $C\text{in}$ of the sample point, the saturation $C1$ of the first boundary point, and the saturation difference $\Delta C\text{max}$ by $$\Delta C\text{in}=\Delta C\text{max}\cdot C\text{in}/C1;\text{ and}$$

calculating a corrected saturation $C\text{out}$ of the sample point, to map the sample point into the destination gamut, by $$C\text{out}=(k2\cdot C\text{in}-\Delta C\text{in})k1,$$

where $k1=1+0.045/2\times\Delta C\text{in}$, and $k2=1-0.045/2\times\Delta C\text{in}$, wherein an amount of correcting the saturation grows larger as the saturation of the sample point rises.

2. The method according to claim 1, further comprising the step of matching lightness of the source gamut and lightness of the destination gamut.

3. The method according to claim 2, wherein the line indicates the same lightness and the same hue of the sample point.

4. The method according to claim 1, further comprising the step of generating a color conversion table using the mapped sample point.

5. A color processing apparatus for determining saturation compression based on a visual characteristic, comprising:

a first calculator, arranged to calculate first and second boundary points, wherein the first boundary point is an intersection point of a line passing a sample point in a source gamut and a boundary of the source gamut, and the second boundary point is an intersection point of the line and a boundary of a destination gamut;

a second calculator, arranged to calculate a saturation difference $\Delta C\text{max}$ from saturation $C1$ of the first boundary point and saturation $C2$ of the second boundary point by $$\Delta C\text{max}=\sqrt{\{(C1-C2)/(1+0.045C^*)\}^2};$$

a third calculator, arranged to calculate a saturation difference $\Delta C\text{in}$ from saturation $C\text{in}$ of the sample point, the saturation $C1$ of the first boundary point, and the saturation difference $\Delta C\text{max}$ by $$\Delta C\text{in}=\Delta C\text{max}\cdot C\text{in}/C1;\text{ and}$$

a corrector, arranged to calculate a corrected saturation $C\text{out}$ of the sample point, to map the sample point into the destination gamut, by $$C\text{out}=(k2\cdot C\text{in}-\Delta C\text{in})k1,$$

where $k1=1+0.045/2\times\Delta C\text{in}$, and $k2=1-0.045/2\times\Delta C\text{in}$, wherein an amount of correcting the saturation grows larger as the saturation of the sample point rises.

6. A computer-readable storage medium storing a computer-executable program for causing a computer to perform a color processing method of determining saturation compression based on a visual characteristic, the method comprising the steps of:

calculating first and second boundary points, wherein the first boundary point is an intersection point of a line passing a sample point in a source gamut and a boundary of the source gamut, and the second boundary point is an intersection point of the line and a boundary of a destination gamut;

calculating a saturation difference $\Delta Cmax$ from saturation $C1$ of the first boundary point and saturation $C2$ of the second boundary point by $\Delta Cmax = \sqrt{\{(C1-C2)/(1+0.045 C^*)\}^2}$;

calculating a saturation difference $\Delta Cin$ from saturation $Cin$ of the sample point, the saturation $C1$ of the first boundary point, and the saturation difference $\Delta Cmax$ by $\Delta Cin = \Delta Cmax \cdot Cin/C1$; and calculating a corrected saturation $Cout$ of the sample point, to map the sample point into the destination gamut, by $Cout = (k2 \cdot Cin - \Delta Cin)k1$, where $k1 = 1 + 0.045/2 \times \Delta Cin$, and $k2 = 1 - 0.045/2 \times \Delta Cin$, wherein an amount of correcting the saturation grows larger as the saturation of the sample point rises.

* * * * *